(12) United States Patent
Dong

(10) Patent No.: US 11,139,894 B2
(45) Date of Patent: Oct. 5, 2021

(54) DATA TRANSMISSION ON PHASE COMPONENTS OF AN OPTICAL CARRIER BY DIRECT MODULATION OF REFLECTORS OF A LASER

(71) Applicant: Nokia Solutions and Networks Oy, Espoo (FI)

(72) Inventor: Po Dong, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/075,387

(22) Filed: Oct. 20, 2020

(65) Prior Publication Data

US 2021/0119707 A1 Apr. 22, 2021

Related U.S. Application Data

(60) Provisional application No. 62/924,499, filed on Oct. 22, 2019.

(51) Int. Cl.
*H04B 10/04* (2006.01)
*H04B 10/50* (2013.01)

(52) U.S. Cl.
CPC ... *H04B 10/50597* (2013.01); *H04B 10/5053* (2013.01); *H04B 10/5057* (2013.01)

(58) Field of Classification Search
CPC ............ H04B 10/5053; H04B 10/5059; H04B 10/5057; H04B 10/548; H04B 10/5561;
(Continued)

(56) References Cited

U.S. PATENT DOCUMENTS 3,766,393 A * 10/1973 Herzog ................. H01S 3/1075
372/97
7,636,501 B2 * 12/2009 Doerr .................... G02F 1/2257
359/245

(Continued)

OTHER PUBLICATIONS

"Model Reflectivity Modulated External Cavity Lasers Using TWLM", Lumerical Knowledge Exchange, 2018, 5 pages, online postings available at : https://kx.lumerical.com/t/model-reflectivity-modulated-external-cavity-lasers-using-twlm/15269.

(Continued)

*Primary Examiner* — Hanh Phan
(74) *Attorney, Agent, or Firm* — Nokia Technologies Oy

(57) ABSTRACT

An apparatus includes a laser, an optical power combiner, and an electronic controller. The laser has a plurality of modulatable optical reflectors and is operable to emit mutually coherent optical beams from the modulatable optical reflectors. The optical power combiner has a first optical inputs connected to receive light of one of the optical beams emitted from a first of the modulatable optical reflectors and has a second optical input connected to receive light of one of the optical beams emitted from a second of the modulatable optical reflectors. The electronic controller is connected to operate the first and second of the modulatable optical reflectors to modulate the optical beams emitted therefrom to carry respective first and second data streams. The optical power combiner is connected to interfere the light received from the first and second of the modulatable optical reflectors with a relative phase difference.

17 Claims, 6 Drawing Sheets

(58) Field of Classification Search
CPC ............... H04B 10/516; H04B 10/541; H04B 10/50577; H04B 10/50597; H04B 10/40
USPC ... 398/183, 188, 158, 159, 79, 65, 184, 152, 398/192, 193, 194, 195, 196, 197, 198, 398/135, 136; 359/245, 237, 238, 239, 359/248, 279; 385/1, 2, 3, 14
See application file for complete search history.

(56) References Cited

U.S. PATENT DOCUMENTS

| | | | | |
|---|---|---|---|---|
| 8,238,759 | B2* | 8/2012 | Joyner | H04B 10/5561 398/183 |
| 9,148,227 | B2* | 9/2015 | Kim | H04B 10/2587 |
| 10,411,807 | B1* | 9/2019 | Earnshaw | G02F 1/21 |
| 10,693,275 | B2 | 6/2020 | Dong et al. | |
| 2005/0175358 | A1* | 8/2005 | Ilchenko | H04B 10/60 398/198 |
| 2006/0210282 | A1 | 9/2006 | Iannelli | |
| 2012/0002978 | A1* | 1/2012 | Healey | H04B 10/5165 398/183 |

OTHER PUBLICATIONS

Z. Liu et al., "Modulator-free Quadrature Amplitude Modulation Signal Synthesis", Nature Communications, vol. 5, Article No. 5911, Dec. 19, 2014, pp. 1-12.

F. Yuan, "Short-reach Optical Communication Using Directly Modulated Lasers", Thesis, 2017, 119 pages.

G. de Valicourt et al., "Hybrid-integrated Wavelength and Reflectivity Tunable III-V/silicon Transmitter", Journal of Lightwave Technology, vol. 35, No. 8, Apr. 15, 2017, pp. 1376-1382.

W. Sacher et al., "High-speed Laser Modulation Beyond the Relaxation Resonance Frequency Limit", Optics Express vol. 18, No. 7, Mar. 29, 2010, pp. 7047-7054.

H.-G.Lu et al, title and abstract of "Measurement of reflectivity of optical mirrors using laser phase modulation and fineness of Fabry-Perot cavity", Dec. 2006, available online at: https://www.researchgate.net/publication/291076033_Measurement_of_reflectivity_of_optical_mirrors_using_laser_phase_modulation_and_fineness_of_Fabry-Perot_cavity.

Beam Splitter, 6 pages, Aug. 15, 2019, available online at: https://en.wikipedia.org/wiki/Beam_splitter.

* cited by examiner

DATA TRANSMISSION ON PHASE COMPONENTS OF AN OPTICAL CARRIER BY DIRECT MODULATION OF REFLECTORS OF A LASER

This application claims the benefit of U.S. provisional patent application No. 62/924,499, filed Oct. 22, 2019, by Po Dong.

BACKGROUND

Technical Field

The inventions relate to optical data transmission and optical data transmitters for separately data-modulating different phase components of an optical wavelength carrier.

Related Art

This section introduces aspects that may be help facilitate a better understanding of the inventions. Accordingly, the statements of this section are to be read in this light and are not to be understood as admissions about what is prior art or what is not prior art.

In optical communication, data-modulated optical signals have been produced by direct laser modulation and by external modulation of a laser. Some types of direct laser modulation have modulated a laser's gain media to produce a modulated optical carrier. Such direct modulation can produce an intensity-modulated optical signal at a low power cost. Such direct laser modulation has been used in short reach applications for optical. Recently, another type of direct modulation has proposed modulating a laser's optical reflector as a manner for producing an intensity-modulated optical signal.

SUMMARY OF SOME ILLUSTRATIVE EMBODIMENTS

Various embodiments are able to produce an optical wavelength carrier whose phase components carry different data-modulations by modulating the transmissivity of modulatable optical reflectors of a laser. Some such embodiments may be used to modulate data onto the symbols of constellations for binary phase shift keying (BPS K), quadrature phase shift keying (QPSK), or N-level quadrature amplitude modulation (N-QAM), e.g., with the integer N being 8, 16, 32, or 64.

In first embodiments, an apparatus includes a laser, an optical power combiner, and an electronic controller. The laser has a plurality of modulatable optical reflectors and is operable to emit mutually coherent optical beams from the modulatable optical reflectors. The optical power combiner has a first optical input connected to receive light of one of the optical beams emitted from a first of the modulatable optical reflectors and has a second optical input connected to receive light of one of the optical beams emitted from a second of the modulatable optical reflectors. The electronic controller is connected to operate the first and second of the modulatable optical reflectors to modulate the optical beams therefrom to carry respective first and second data streams. The optical power combiner is connected to interfere the light received from the first and second of the modulatable optical reflectors with a relative phase difference.

In some embodiments of the above apparatus, the optical power combiner may be connected to output light having an in-phase component carrying the first data stream and a quadrature-phase component carrying the second data stream in response to electronic controller operating the first and second modulatable optical reflectors.

In some embodiments of any of the above apparatus, the electronic controller may be capable of operating the first and second tunable optical filters such that the apparatus outputs light modulated according to a quadrature phase shift keying (QPSK) constellation or according to an N-symbol quadrature amplitude modulation (QAM) constellation with N being 8, 16, 32, 64, or more.

In some embodiments of any of the above apparatus, the laser may include one or more inter-cavity tunable optical filters having an optical passband configured to pass light of the laser and to attenuate optical sidebands of said light, the one or more sidebands being produced by one or more of the modulatable optical reflectors being modulating by the controller at a baud rate.

In some embodiments of any of the above apparatus, either or both of the modulatable optical reflectors may include a Michelson interferometric modulator (MIM).

In some embodiments of any of the above apparatus, the laser may include a 1×2 optical power splitter connecting an optical gain media and first and second separate optical path segments of the laser. The first optical path segment has a segment in the first of the modulatable optical reflectors at an end thereof, and the second optical path segment has a segment in the second of the modulatable optical reflectors at an end thereof.

In some embodiments of any of the above apparatus, the laser may include a 1×N optical power splitter coupling an optical gain media of the laser to N separate optical path segments of the laser, wherein each of the separate optical path segments has one of the modulatable optical reflectors at an end thereof. N may be, e.g., 2 or 4.

In some embodiments, any of the above apparatus may further include a second optical power combiner connected to receive light of one of the optical beams emitted from a third of the modulatable optical reflectors and to receive light of one of the optical beams emitted from a fourth of the modulatable optical reflectors. In such embodiments, the electronic controller is connected to operate the third and fourth of the modulatable optical reflectors to modulate the optical beams therefrom, and the second optical power combiner is connected to interfere the light received from the third and fourth of the modulatable optical reflectors with a relative phase difference. In some such embodiments, the apparatus may further include a polarization combiner having optical inputs connected to combine light from the two optical power combiners with a relative polarization rotation, e.g., a relative rotation of about 90 degrees.

In some embodiments of the apparatus, the first and second of the modulatable optical reflectors may be at opposite ends of an optical laser cavity of the laser.

In second embodiments, a method of operating an optical data transmitter includes operating a first modulatable optical reflector of a laser to modulate a first optical beam to carry a first data stream. The method includes operating a second modulatable optical reflector of the laser to modulate a second optical beam to carry a second data stream, wherein the second optical beam is mutually coherent with the first optical beam. The method also includes optically combining the modulated first and second optical beams with a relative phase difference to produce an optical wavelength signal whose different phase components carry the first and second data streams.

In some embodiments, the above method may further include passing light reflected by, at least, one of the modulatable optical reflectors through an optical filter configured to attenuate sidebands thereof produced by modulation of the reflected light by the, at least, one of the modulatable optical reflectors.

In some embodiments, any of the above methods may further include operating a third modulatable optical reflector of the laser to modulate a third optical beam to carry a third data stream, wherein the third optical beam is mutually coherent with the first optical beam. In such embodiments, the method also includes optically combining the optical wavelength signal whose different phase components carry the first and second data streams and the modulated third optical beam with different relative polarizations.

In any of the above embodiments of a method, the optical wavelength signal may be modulated to carry the symbols of a quadrature phase shift keying (QPSK) constellation or may be modulated to carry the symbols of a quadrature amplitude modulation (QAM) constellation, e.g., with 8, 16, 32. 64, or more symbols.

In the Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments and examples described in the Figures and the Detailed Description of Illustrative Embodiments.

DETAILED DESCRIPTION OF ILLUSTRATIVE EMBODIMENTS

Herein, an optical path (OP) may be a free space path segment, an optical fiber segment, a planar optical waveguide segment, or a sequential combination of any such segments. An optical path may or may not also include portions of one or more other optical elements, e.g., an optical data modulator, an optical interferometer, an optical coupler, an optical amplifier, an optical filter, an optical reflector, and/or bulk optical element(s) such as a refractive lens and/or a mirror.

Herein, a modulatable optical reflector is an optical reflector having an optical transmissivity modulatable at high frequencies for data transmission, e.g., such an optical reflector may be modulatable at frequencies of about 1 giga-Hertz or more. In such an optical reflector, modulation often causes a modulation of both the reflectivity and the transmissivity of the optical reflector together and at a same frequency. Such an optical reflector may be modulated, e.g., by waves traveling on waveguide electrode(s) therein.

U.S. provisional patent application No. 62/924,499, filed Oct. 22, 2019, by Po Dong, is incorporate by reference herein, in its entirety.

Figure 1:
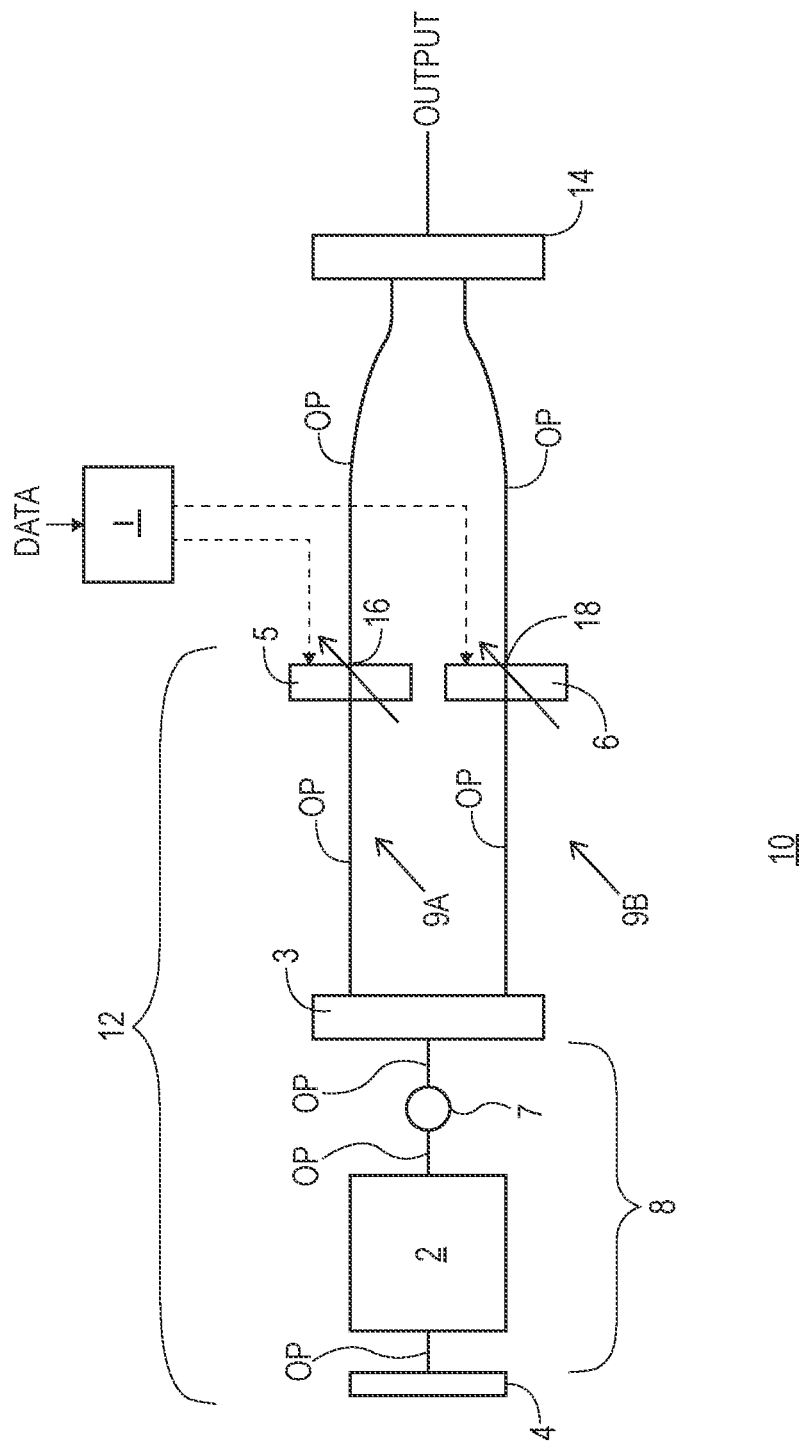
FIG. 1 is a block diagram illustrating a first example of an optical data transmitter that separately data-modulates different phase components of a coherent optical wavelength carrier.

FIG. 1 illustrates a first example of an optical data transmitter 10 for producing an optical wavelength signal with two data-modulated phase components. The optical data transmitter 10 includes a laser 12 with two optical outputs 16, 18 and a 2×1 optical power combiner 14. Each of the optical outputs 16, 18 of the laser 12 connects via a corresponding optical path OP to one of the optical inputs of the 2×1 optical power combiner 14. Each optical output 16, 18 emits a data-modulating optical wavelength carrier, and the data-modulated optical wavelength carriers emitted from the different optical outputs 16, 18 are mutually coherent with a same optical carrier wavelength. The two optical paths OP are configured such that the light emitted from the optical outputs 16, 18 is interfered in the 2×1 optical power combiner 14 with a fixed relative phase difference and typically with about the same polarization. For example, one or both of the optical paths OP may have a thermally and/or voltage tunable optical phase shifter (OPS) thereon to enable adjusting or setting of this fixed relative phase difference. As an example, the fixed relative phase difference may be about 90 degrees, e.g., 90°±5°, 90°±2°, or even 90°±1°. For such an example embodiment, the 2×1 optical power combiner 14 outputs a data-modulated wavelength signal with independent phase modulations on in-phase (I) and quadrature-phase (Q) components thereof in response to receiving the two data-modulated optical wavelength carriers.

The laser 12 includes two optically coupled, optical laser cavities. The first optical laser cavity is between an optical reflector 4 and a first modulatable optical reflector 5, and the second optical cavity is between the optical reflector 4 and a second modulatable optical reflector 6. The two optical laser cavities have a shared optical path segment 8 and also have separate optical path segments 9A, 9B, which are connected in parallel to the shared optical path segment 8 via a 1×2 optical power splitter 3. The shared optical path segment 8 includes an optical gain media 2, e.g., a conventional group III-V or II-VI semiconductor optical amplifier (SOA) having a quantum well structure. The shared optical path segment 8 optically terminates, at one end, at the optical reflector 4. The parallel separate optical path segments 9A, 9B are optically terminated at far ends thereof by the modulatable optical reflectors 5, 6.

In the laser 12, one or more of the shared and separate optical path segments 8, 9A, 9B may include a tunable optical filter 7. Such tunable optical filter(s) 7 may be, e.g., thermally tunable optical ring resonators or other tunable optical resonator filters, e.g., optical filter(s) tunable at low speeds. Each tunable optical filter 7 has a much narrower wavelength responsivity, e.g., much narrower optical passband(s), than the optical reflector 4 and the modulatable optical reflectors 5, 6 and thus, may enable laser cavities of the laser 12 to have larger free spectral ranges (FSRs). Indeed, in embodiments with periodic types of the tunable optical filters 7, some of the one or more tunable optical filters 7 may have different FSRs so that the set of tunable optical filters 7 can be adjusted together to further increase the FSR of the optical cavities of the laser 12 via a Vernier effect.

In the laser 12, one or more of the shared and separate optical path segments 8, 9A, 9B may include an adjustable optical phase shifter thereon (not shown). Such optical phase shifter(s) enable(s) adjustment of optical path lengths of the two optical laser cavities.

The laser 12 is configured so that the two optical laser cavities lase together at the same optical wavelength. That is, the optical laser cavity between the optical reflector 4 and the modulatable optical reflector 5 lases together with the optical laser cavity between the optical reflector 4 and the modulatable optical reflector 6. To lase together, the optical path lengths of segments of one or both optical laser cavities may be adjusted so that light therein constructively interferes in the optical gain media 2, e.g., with about the same amplitude. The adjusting may involve adjusting the optical phase shifter(s) in the shared optical path segment 8, in the first separate optical path segment 9A, and/or in the second separate optical path segment 9B. Also, in such a lasing state, each tunable optical filter 7 is tuned or configured so that the lasing optical wavelength is in an optical passband of said optical tunable optical filter 7. A state in which both optical laser cavities lase together may be simpler to set up than a second state in which only one of the optical laser cavities lases, because intra-optical laser cavity loss can be lower in the state, in which both optical laser cavities lase together, e.g., due to the 2×1 optical power splitter.

The optical data transmitter 10 modulates received data onto an optical wavelength carrier by modulating the transmissivity of the two modulatable optical reflectors 5, 6. In particular, the electronic controller 1 may modulate the phase and/or amplitude of the optical carrier emitted from each of the modulatable optical reflectors 5, 6 to carry portions of the data (DATA) received by the electronic controller 1. That is, each modulatable optical reflector 5, 6 may be separately controlled, by the electronic controller 1, to modulate a different portion of the received data stream DATA onto the optical wavelength carrier. Due to a relative optical path length difference between the optical paths OP connecting the modulatable optical reflectors 5, 6 to the 2×2 optical power combiner 14, the 2×1 optical power combiner 14 outputs an optical wavelength carrier whose first and second phase components, e.g., I and Q components, carry data modulated onto the optical wavelength carrier by the first and second modulatable optical reflectors 5, 6, respectively.

Due to such data-modulation, the modulatable optical reflectors 5, 6 typically reflect a data-modulated optical wavelength carrier back into the corresponding optical laser cavity of the laser 12. To avoid crosstalk, between the modulatable optical reflectors 5, 6, due to such reflective optical feedback, the one or more tunable optical filters 7 may be configured to have optical passbands, which are narrow enough to attenuate or substantially remove sidebands of the optical wavelength carrier produced by modulation at the modulation frequency of the modulatable optical reflectors 5, 6 when operated by the electronic controller 1. Such sideband attenuation can eliminate optical crosstalk between the two modulatable optical reflectors 5, 6.

Typically, the parallel separate optical path segments 9A, 9B and the modulatable optical reflectors 5, 6 are fabricated in optical media that does not produce optical gain, e.g., planar silicon waveguide structures. For that reason, the emitted data-modulated optical wavelength carriers may be producible with a low frequency chirp.

The optical gain media 2 may be fabricated as an optical waveguide structure in group III-V or II-VI semiconductor, e.g., as group III-V or II-VI, quantum well device.

Figure 2A:
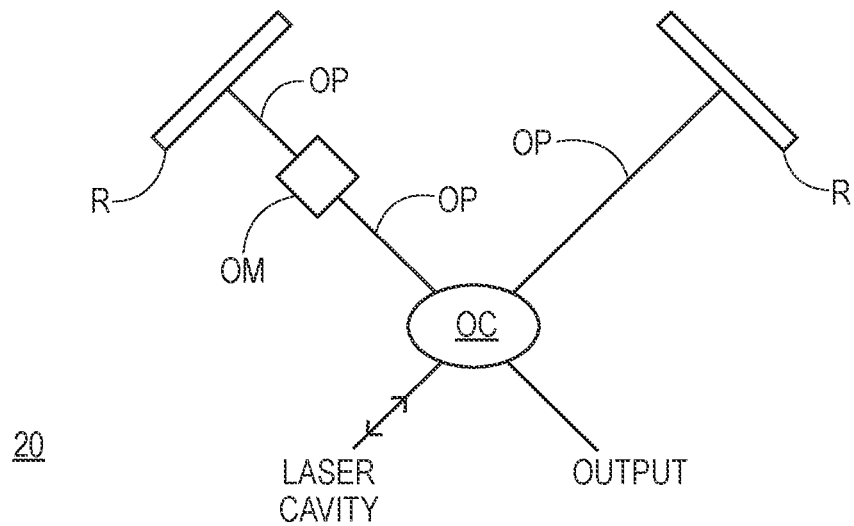
FIGS. 2A and 2B are block diagrams illustrating alternate embodiments of dynamically modulatable optical reflectors for use in the laser of FIG. 1.
Figure 2B:
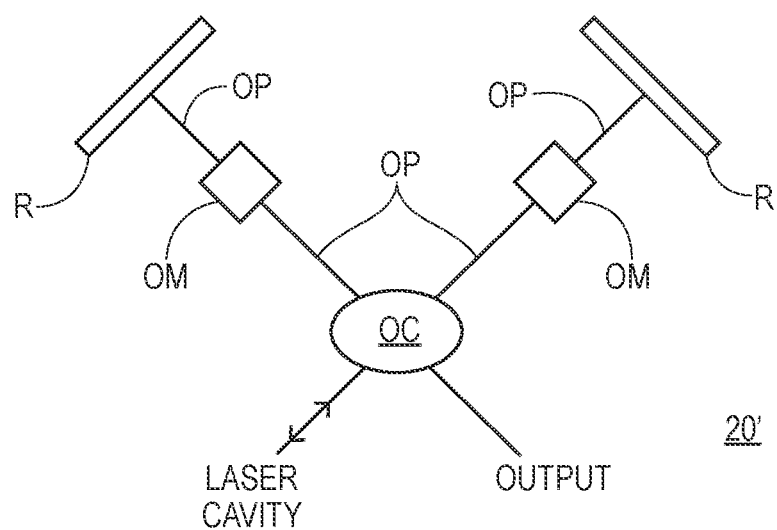

FIGS. 2A and 2B illustrate alternative embodiments 20, 20' of the modulatable optical reflectors 5, 6 of FIG. 1. Each modulatable optical reflector 20, 20' is a Michelson interferometric modulator (MIM). In particular, each modulatable optical reflector 20, 20' has a 2×2 optical power coupler OC and two optical reflectors R. Each optical reflector R is coupled to a corresponding optical output of the 2×2 optical power coupler OC via a corresponding optical path OP. One or both optical paths OP include(s) an optical phase modulator OM. Each optical phase modulator OM is modulatable at a high frequency suitable for optical data transmission, i.e., at a baud rate of the optical data transmitter 10, e.g., a frequency of 1 giga-Hertz or more, and may include modulation waveguide electrode(s), e.g., radio frequency (RF) traveling wave electrodes. Based on the present disclosure, the skilled person would understand how to operate the optical phase modulator(s) OM of such of the modulatable optical reflectors 20, 20' to emit therefrom a phase and/or amplitude modulated optical wavelength carrier for carrying the symbols of various modulation constellations. For example, such modulatable optical reflectors 20, 20' may be operated to emit an optical wavelength carrier with a binary phase shift keying (BPSK) or N-level pulse amplitude modulation (PAM-N), i.e., N=2, 4, or 8, so that the optical data transmitter 10 can output an optical wavelength carrier modulated according to QPSK or according to N-QAM with N=8, 16, 32, 64, or more.

The modulatable optical reflector 20' of FIG. 2B has optical phase modulators OM on both optical paths OP therein. Such paired optical phase modulators OM may be electrically driven in a differential mode that enables lower noise operation.

Figure 3:
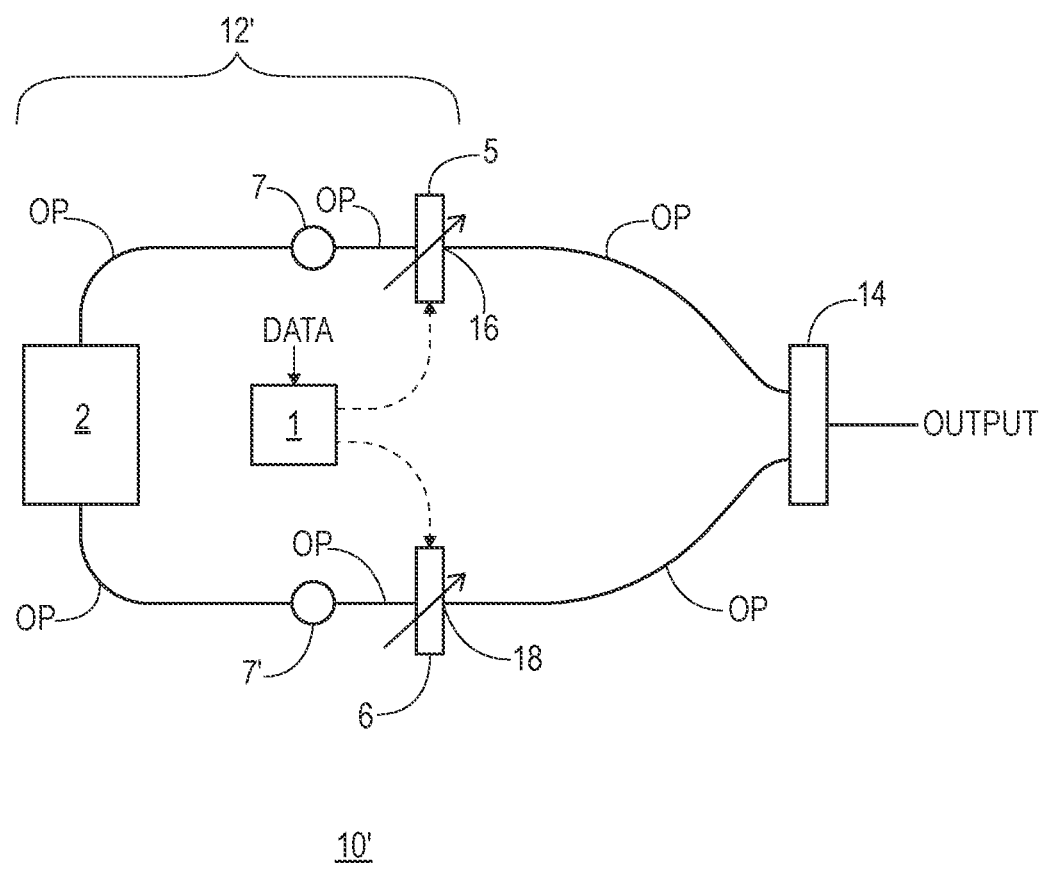
FIG. 3 is a block diagram illustrating a second example of an optical data transmitter that separately data-modulates different phase components of a coherent optical wavelength carrier.

FIG. 3 illustrates a second example of an optical data transmitter 10' for separately data-modulating different phase components of an optical wavelength carrier. The optical data transmitter 10' includes a laser 12' with two optical outputs 16, 18 and a 2×1 optical power combiner 14. Each of the optical outputs 16, 18 of the laser 12' connects via a corresponding optical path OP to one of the optical inputs of the 2×1 optical power combiner 14. Each optical output 16, 18 emits a data-modulating optical wavelength carrier, and the data-modulated optical carriers of the different optical outputs 16, 18 are mutually coherent and are at the same optical wavelength. The optical paths OP are configured such that the light from the optical outputs 16, 18 is interfered in the 2×1 optical power combiner 14 with a fixed relative phase difference, e.g., via a fixed path length difference one or more controllable optical phase shifters (OPS) as already discussed with respect to FIG. 1. For example, the fixed relative phase difference may be about 90 degrees, e.g., 90°±5°, 90°±2°, or even 90°±1° or less, so that the 2×1 optical power combiner 14 outputs an optical wavelength carrier with independent data-modulations on in-phase (I) and quadrature-phase (Q) components thereof.

The laser 12' has a single optical laser cavity between first and second modulatable optical reflectors 5, 6. The optical laser cavity includes an optical gain media 2 and may include one or more tunable optical filters 7, 7', e.g., optical filters tunable at low speeds. The optical gain media 2 may be, e.g., a semiconductor optical amplifier, e.g., fabricated as an optical waveguide structure in group III-V or II-VI semiconductor as a quantum well device. Each tunable optical filter 7, 7' has a narrower wavelength responsivity, e.g., one or more narrower optical passbands, than the modulatable optical reflectors 5, 6 and can provide to the optical cavity one or more larger free spectral ranges (FSRs) in a manner already described with respect to the tunable optical filter(s) 7 of the laser 12 of FIG. 1. In embodiments with multiple tunable optical filters 7, 7', as shown, some of the different tunable optical filters 7, 7' may have different FSRs, e.g., so that the FSR of the optical laser cavity is settable to be even larger due to a Vernier effect between the FSRs of the different tunable optical filters 7, 7'.

In the laser 12', the optical laser cavity may also include one or more adjustable optical phase shifters, e.g., thermally controlled optical phase shifter(s), to enable adjustment of an optical path length of the optical laser cavity.

The optical data transmitter 10' modulates received data DATA onto an optical wavelength carrier by modulating the transmissivity of the two modulatable optical reflectors 5, 6 under control of the electronic controller 1 as already described with respect to the optical data transmitter 10 of FIG. 1. In particular, each modulatable optical reflector 5, 6 may be separately operated, by the electronic controller 1, to modulate a different data stream onto the optical wavelength carrier received thereat. Due to a relative optical path length difference between optical paths OP connecting the modulatable optical reflectors 5, 6 to the 2×1 optical power combiner 14, the 2×1 optical power combiner 14 can be configured to output an optical wavelength beam with different first and second phase components, e.g., I and Q components, separately data-modulated by the first and second modulatable optical reflectors 5, 6, respectively.

Due to the data-modulation, the modulatable optical reflectors 5, 6 typically reflect a data-modulated optical wavelength carrier back into the optical laser cavity of the laser 12'. But, one or more of the tunable optical filters 7, 7' or the serial combination of both tunable optical filters 7, 7' may have one or more narrow optical passbands to attenuate or substantially remove the sidebands of the optical wavelength carrier produced by data-modulation at the data-modulation frequency, i.e., the baud rate, set by the electronic controller 1. Such sideband attenuation can help to eliminate optical crosstalk between the two modulatable optical reflectors 5, 6.

Figure 4:
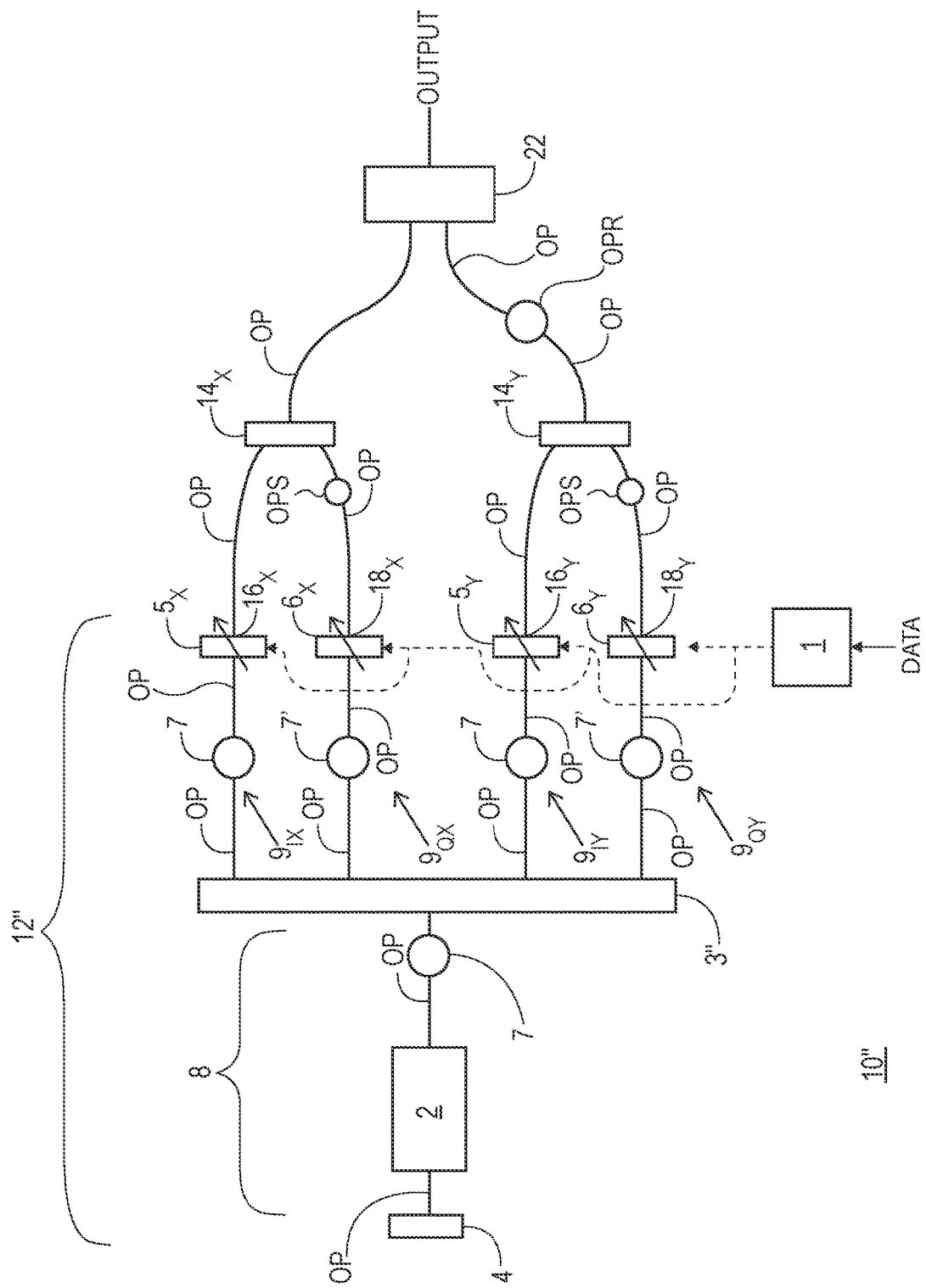
FIG. 4 is a block diagram illustrating a first example of an optical data transmitter that separately data-modulates different phase components of a coherent optical wavelength carrier to produce a polarization multiplexed optical signal.

FIG. 4 illustrates an optical data transmitter 10'' to separately data-modulate different phase components of two polarizations of an output coherent optical wavelength carrier, e.g., to provide separate data-modulations to two phase-components of two about orthogonal polarizations of a produced optical wavelength carrier. That is, the optical data transmitter 10'' for orthogonal polarizations can produce a data-modulation based on polarization multiplexing.

The optical data transmitter 10'' includes a laser 12'' with two pairs of optical outputs, i.e., X-pair ($16_X$, $18_X$) and Y-pair ($16_Y$, $18_Y$), two 2×1 optical power combiners $14_X$, $14_Y$, and an optical polarization combiner 22. Each optical output $16_X$, $18_X$, $16_Y$, $18_Y$ emits a data-modulating optical wavelength carrier, and the data-modulated optical carriers from the different optical outputs $16_X$, $18_X$, $16_Y$, $18_Y$ are typically mutually coherent and are typically at a same optical wavelength. Each optical output $16_X$, $18_X$, $16_Y$, $18_Y$ of the X-pair and the Y-pair of the laser 12'' connects via a corresponding optical path OP to a corresponding optical input of one of the 2×1 optical power combiners $14_X$, $14_Y$.

Two optical paths OP connect each pair of the optical outputs $16_X$, $18_X$, $16_Y$, $18_Y$, i.e., the X-pair or the Y-pair, such that the light from each pair of the optical outputs ($16_X$, $18_X$) and ($16_Y$, $18_Y$) is interfered in one of the 2×1 optical power combiners $14_X$, $14_Y$ with a fixed relative phase difference. For example, the fixed relative phase differences may be set fixed optical path length differences or by optical phase shifters (OPS) on some of the optical paths OP between the optical outputs $16_X$, $18_X$, $16_Y$, $18_Y$ and the optical power combiners $14_X$, $14_Y$, e.g., as already illustrated in FIG. 1. For both the X-pair and the Y-pair, the fixed relative phase differences may be about 90 degrees, e.g., 90°±5°, 90°±2°, or even 90°±1° or less. For these reasons, each 2×1 optical power combiner $14_X$, $14_Y$ may output a data-modulated optical wavelength carrier with independent phase modulations on I and Q phase-components thereof. These I- and Q-modulated optical wavelength carriers are combined with about orthogonal polarization by the polarization beam combiner 22 to produce, at an optical output thereof, an optical wavelength carrier carrying different data streams on the I- and Q-components of each orthogonal polarization thereof. In some embodiments, one of the optical paths connected to the optical polarization combiner 22 includes a separate optical polarization rotator (OPR) to polarization rotate light therein so that the polarization combiner 22 combines light received at its two optical inputs with a desired relative polarization rotation, e.g., about 90 degrees.

The laser 12'' includes four optically coupled optical laser cavities. The first optical laser cavity is between an optical reflector 4 and a first modulatable optical reflector $5_X$. The second optical cavity is between the optical reflector 4 and a second modulatable optical reflector $6_X$. The third optical cavity is between the optical reflector 4 and a third modulatable optical reflector $5_Y$. The fourth optical cavity is between the optical reflector 4 and a fourth modulatable optical reflector $6_Y$. The four optical laser cavities have a shared optical path segment 8 and separate optical path segments $9_{IX}$, $9_{QX}$, $9_{IY}$, $9_{QY}$, which are optically connected in parallel to the shared optical path segment 8 via a 1×4 optical power splitter 3''. The shared optical path segment 8 includes optical gain media 2, e.g., a semiconductor optical amplifier (SOA), and is terminated, at one end, by the optical reflector 4, e.g., the optical reflector 4 is located on or near one end of the SOA. The parallel separate optical path segments $9_{IX}$, $9_QX$, $9_{IY}$, $9_QY$ are terminated at far ends thereof by corresponding ones of the modulatable optical reflectors $5_X$, $6_X$, $5_Y$, $6_Y$.

The laser 12'' may include one or more tunable optical filters 7, 7' in any or all of the shared and separate optical path segments 8, $9_{IX}$, $9_{QX}$, $9_{IY}$, $9_{QY}$. Such tunable optical filter(s) 7, 7' may be, e.g., thermally tunable optical ring resonators or may be other tunable optical resonators, e.g., which are tunable at low speeds. Each tunable optical filter 7, 7' typically has a much narrower wavelength responsivity, e.g., narrower optical passband(s), than the optical reflectors 4, $5_X$, $6_X$, $5_Y$, $6_Y$ and thus, may cause one or more of the optical laser cavities of the laser 12'' to have larger FSRs. In embodiments with a plurality of periodic types of the optical filters 7, 7', two or more individual ones of the tunable optical filters 7, 7' may have different FSRs so that the optical laser cavities of the laser 12'' can be configured to have an increased FSR due to a Vernier effect.

In the laser 12'', one or more of the shared and separate optical path segments 8, $9_{IX}$, $9_{QX}$, $9_{IY}$, $9_{QY}$ may also include an adjustable optical phase shifter thereon (not shown), e.g., a thermally adjustable optical phase shifter. Such optical phase shifter(s) enable(s) adjustment of optical path lengths of the different optical laser cavities.

The laser 12" is configured so that the four optical laser cavities lase together at the same optical wavelength. That is, each optical cavity between the optical reflector 4 and one of the modulatable optical reflectors $5_X$, $6_X$, $5_Y$, $6_Y$ is configured to lase together in normal operation. To lase together, the optical path lengths of one or more segments of the four optical laser cavities may be adjusted so that light of each of these optical laser cavities constructively interferes in the optical gain media 2, e.g., with about the same amplitude. Such adjustment of optical path lengths may involve adjusting slowly adjustable optical phase shifter(s) in the shared optical path segment 8 and/or in one or more of the separate optical path segments $9_{IX}$, $9_{QX}$, $9_{IY}$, $9_{QY}$. Also, in such a lasing state, the tunable optical filter(s) 7, 7' are tuned so that the lasing optical wavelength is in an optical passband of each optical tunable optical filter 7, 7'. Such a combined lasing state of the four optical cavities may be simpler to setup than in second lasing states involving lasing together of less of the optical laser cavities, because intra-optical laser cavity loss can be lower than in such a combined lasing state than in the second lasing states, in which less than all said optical cavities lase together, e.g., due to the action of the 4×1 optical power splitter.

The optical data transmitter 10" modulates received data onto an optical wavelength carrier by modulating the transmissivity of the four modulatable optical reflectors $5_X$, $6_X$, $5_Y$, $6_Y$. In particular, an electronic controller 1 may modulate the phase and/or amplitude of the optical carrier emitted from each of the modulatable optical reflectors $5_X$, $6_X$, $5_Y$, $6_Y$ to carry portions of the data DATA received by the electronic controller 1. That is, each modulatable optical reflector $5_X$, $6_X$, $5_Y$, $6_Y$ may be separately controlled, by the electronic controller 1, to modulate a different data stream onto the optical wavelength carrier emitted therefrom. Due to a relative optical path length differences in the optical paths OP coupling the 2×1 optical power combiners $14_X$, $14_Y$ to the optical outputs $16_X$, $18_X$, $16_Y$, $18_Y$, each of the 2×1 optical power combiners $14_X$, $14_Y$ outputs an optical wavelength carrier whose first and second phase components, e.g., I and Q components, are data-modulated by a corresponding one of the modulatable optical reflectors $5_X$, $6_X$, $5_Y$, $6_Y$, i.e., by the modulatable optical reflectors of the X-pair ($5_X$, $6_X$) or the Y-pair ($5_Y$, $6_Y$).

Due to the data-modulation, each of the modulatable optical reflectors $5_X$, $6_X$, $5_Y$, $6_Y$ typically reflects a data-modulated optical wavelength carrier back into the corresponding optical laser cavity of the laser 12". To avoid crosstalk, the one or more tunable optical filters 7, 7' may be configured to have optical passband(s) narrow enough to attenuate or substantially remove sidebands of the optical wavelength carriers produced by data-modulation at the modulation frequency of the modulatable optical reflectors $5_X$, $6_X$, $5_Y$, $6_Y$, i.e., at the baud rate determined by the electronic controller 1. Such sideband attenuation can eliminate optical crosstalk between the data-modulated optical carriers emitted from different ones of the modulatable optical reflectors $5_X$, $6_X$, $5_Y$, $6_Y$.

Typically, the parallel separate optical path segments $9_{IX}$, $9_{QX}$, $9_{IY}$, $9_{QY}$ and the modulatable optical reflectors $5_X$, $6_X$, $5_Y$, $6_Y$ are fabricated in optical media that does not produce optical gain, e.g., silicon waveguide structures. For that reason, the produced data-modulated optical carriers can have low frequency chirp.

The optical gain media 2 may be fabricated as an optical waveguide structure in group III-V or II-VI semiconductor, e.g., as a quantum well device.

Figure 5:
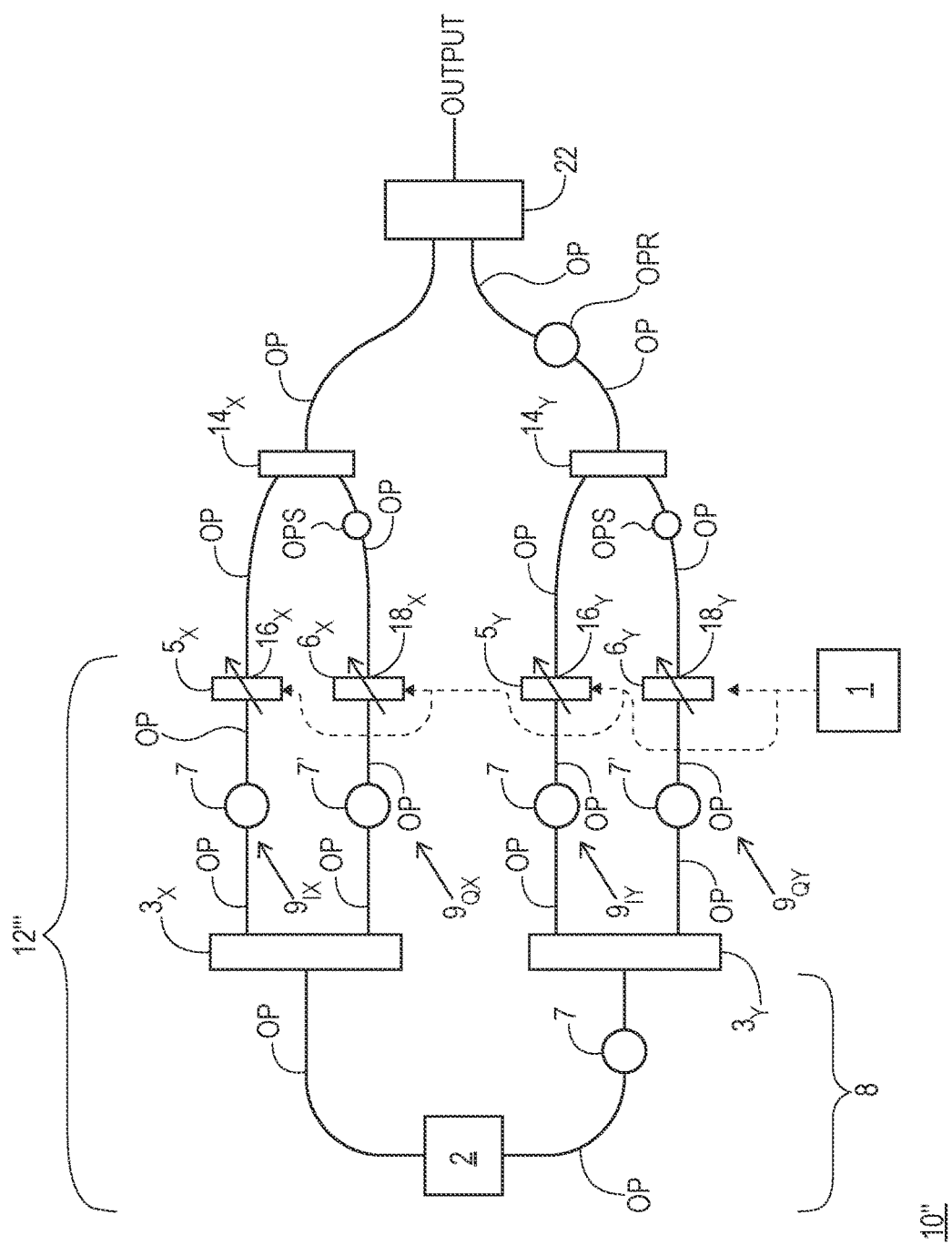
FIG. 5 is a block diagram illustrating a second example of an optical data transmitter that separately data-modulates different phase components of a coherent optical wavelength carrier to produce a polarization multiplexed optical signal.

FIG. 5 illustrates a second example of an optical data transmitter 10''' to enable separate data-modulation of different phase components of each polarization of a coherent optical wavelength carrier, e.g., orthogonal polarizations of the finally transmitted data-modulated optical signal. That is, the optical data transmitter 10" can be configured to provide polarization multiplexing.

The optical data transmitter 10''' also includes a laser 12''' with X- and Y-pairs of optical outputs, i.e., X-pair ($16_X$, $18_X$) and Y-pair ($16_Y$, $18_Y$), two 2×1 optical power combiners $14_X$, $14_Y$, and a polarization combiner 22. Each optical output $16_X$, $18_X$, $16_Y$, $18_Y$ of the laser 12''' is configurable to emit a mutually coherent, data-modulated optical wavelength carrier on the same optical wavelength, i.e., as already described with respect to the laser 12" of FIG. 4. Also, in the optical data transmitter 10''' of FIG. 5, the X-pair of optical outputs ($16_X$, $18_X$) and Y-pair of optical outputs ($16_Y$, $18_Y$) connect to the two 2×1 optical power combiners $14_X$, $14_Y$ and the polarization combiner 22 as already described with respect to the optical data transmitter 10" of FIG. 4. Thus, the optical data transmitter 10''' of FIG. 5 may also be operated by the electronic controller 1 so that polarization combiner 22 outputs an optical wavelength carrier whose I- and Q-components of each orthogonal polarization are separately data-modulated, i.e., by corresponding ones of the modulatable optical reflectors $5_X$, $6_X$, $5_Y$, $6_Y$.

The laser 12''' also includes four optically coupled, optical laser cavities, wherein each such optical laser cavity is formed between one modulatable optical reflector $5_X$, $6_X$ of the X-pair and one modulatable optical reflector $5_Y$, $6_Y$ of the Y-pair. These four optical laser cavities have a shared optical path segment 8 and separate optical path segments $9_{IX}$, $9_{QX}$, $9_{IY}$, $9_{QY}$, which are optically connected to the shared optical path segment 8 via two 1×2 optical power splitters $3_X$, $3_Y$. The shared optical path segment 8 includes optical gain media 2, e.g., a group III-V or II-VI semiconductor optical amplifier (SOA) as already described herein. The separate optical path segments $9_{IX}$, $9_{QX}$, $9_{IY}$, $9_{QY}$ are terminated at far ends thereof by the modulatable optical reflectors $5_X$, $6_X$, $5_Y$, $6_Y$.

The laser 12''' may include one or more tunable optical filters 7, 7' in any or all of the shared and separate optical path segments 8, $9_{IX}$, $9_{QX}$, $9_{IY}$, $9_{QY}$. Such tunable optical filter(s) 7, 7' may be, e.g., thermally tunable optical ring resonators or other tunable optical resonators, e.g., slowly tunable devices. As with respect to the lasers 12, 12', 12" of FIGS. 1, 3, and 4, the one or more tunable optical filters 7, 7' have a much narrower wavelength responsivity, i.e., one or more narrower passbands, than the optical reflectors $5_X$, $6_X$, $5_Y$, $6_Y$ and may enable the optical laser cavities of the laser 12''' to have larger FSRs. In embodiments with a plurality of periodic tunable optical filters 7, 7', some of the tunable optical filters 7, 7' may have different FSRs so that the optical laser cavities of the laser 12" have an increased FSR due to a Vernier effect.

In the laser 12''', one or more of the shared and separate optical path segments 8, $9_{IX}$, $9_{QX}$, $9_{IY}$, $9_{QY}$ may also include an adjustable optical phase shifter thereon (not shown). Such optical phase shifter(s) enable adjustment of optical path lengths of the individual optical laser cavities.

The laser 12''' is configurable so that the four optically coupled, optical laser cavities lase together at the same optical wavelength. To lase together, the optical path lengths of the four optical laser cavities may be adjusted so that light of each of these optical laser cavities constructively interferes in the optical gain media 2, e.g., with about the same amplitudes therein. Such adjusting may involve adjusting one or more optical phase shifter(s) in the shared optical path segment 8 and/or in the separate optical path segments $9_{IX}$, $9_{QX}$, $9_{IY}$, $9_{QY}$ to produce the constructive interference. Also, in such a lasing state, the one or more tunable optical filter(s) 7, 7' are tuned so that the lasing optical wavelength is in an optical passband of each optical tunable optical filter 7, 7'. Such a lasing state of the four optically coupled, optical laser cavities may be simpler to setup than a second lasing state of less of the optical laser cavities, because intra-optical cavity loss can be lower than in such a second lasing state, in which less than all said optical cavities lase, e.g., due to the two 2×1 optical power splitters $3_X$, $3_Y$.

The optical data transmitter 10''' of FIG. 5 modulates received data onto an optical wavelength carrier by modulating the transmissivity of the four modulatable optical reflectors $5_X$, $6_X$, $5_Y$, $6_Y$, as already explained with respect to the optical data transmitter 10'' of FIG. 4. To avoid modulation crosstalk between the different modulatable optical reflectors $5_X$, $6_X$, $5_Y$, $6_Y$, the one or more tunable optical filters 7, 7' may be configured to have one or more optical passbands, which are narrow enough to attenuate or substantially remove sidebands of the optical wavelength carrier produced by data-modulation at the modulation frequency of the modulatable optical reflectors $5_X$, $6_X$, $5_Y$, $6_Y$, i.e., as already explained with respect to the optical data transmitter 10'' of FIG. 4.

Figure 6:
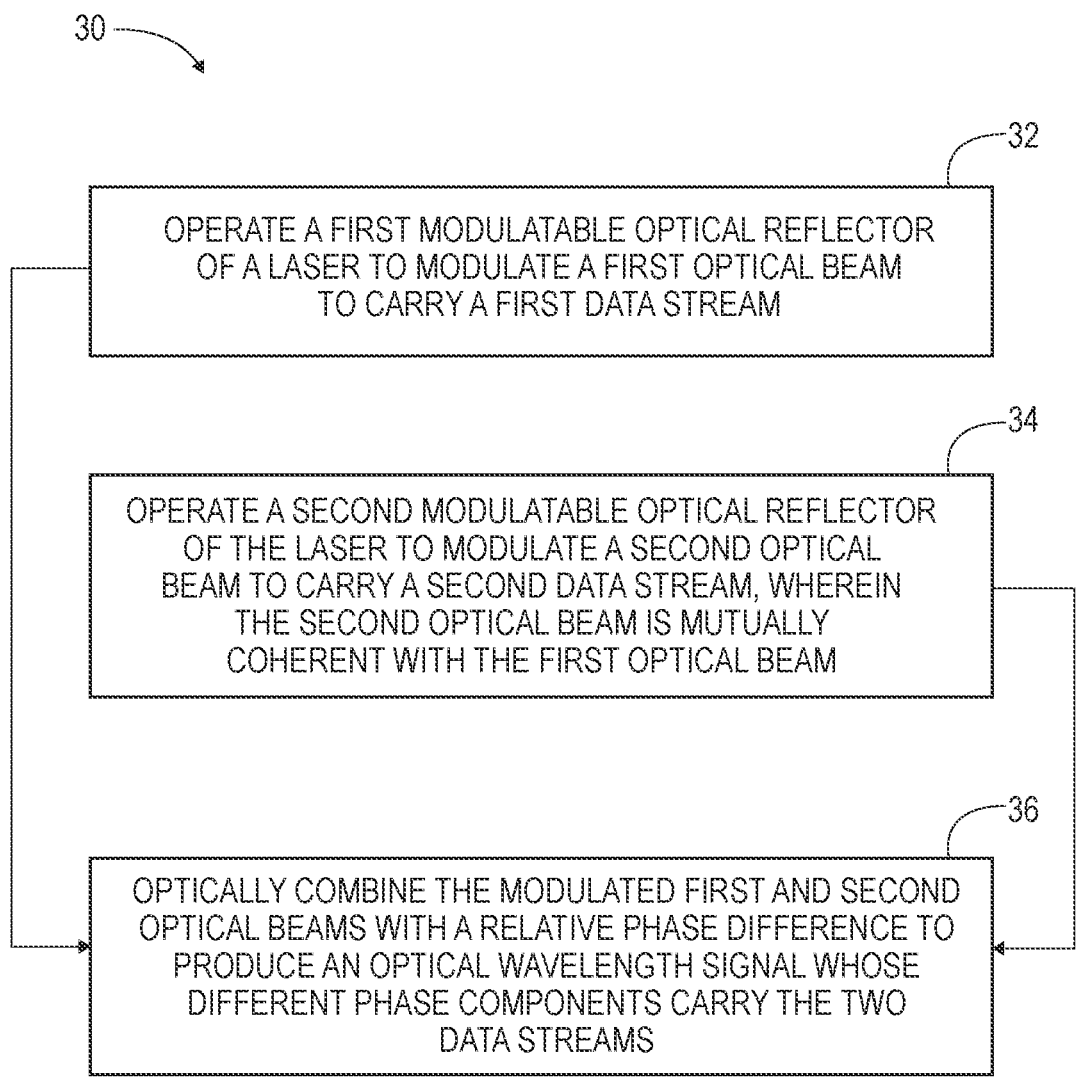
FIG. 6 is a flow chart illustrating a method of operating an optical data transmitter to modulate different phase components of a coherent optical wavelength carrier, e.g., to operate the optical data transmitters of FIGS. 1, 3, 4, and/or 5.

FIG. 6 illustrates a method 30 of operating an optical data transmitter to output an optical wavelength carrier having two phase components, e.g., I and Q components, which carry different data streams. The method 30 may be used, e.g., to operate the optical data transmitters 10, 10', 10'', 10''' of FIGS. 1, 3, 4, and 5.

The method 30 includes operating a first modulatable optical reflector of a laser to modulate a first optical beam to carry a first data stream (step 32). For example, the first modulatable optical reflector can be the modulatable optical reflector 5, $5_X$, or $5_Y$ of FIGS. 1, 3, 4, and 5, the modulated first light beam being emitted through said modulatable optical reflector.

The method 30 includes operating a second modulatable optical reflector of the laser to modulate a second optical beam to carry a second data stream, wherein the second optical beam is mutually coherent with the first optical beam (step 34). For example, the second modulatable optical reflector can be the modulatable optical reflector 6, $6_X$, or $6_Y$ of FIGS. 1, 3, 4, and 5, the modulated second light beam being emitted through said modulatable optical reflector.

The method 30 includes optically combining the modulated first and second optical beams with a relative phase difference, e.g., also with about the same polarization, to produce an optical wavelength signal whose different phase components carry the two data streams (step 36). For example, the optical combining may be performed with optical paths OP and the 2×1 optical power combiner 14, $14_X$, or $14_Y$ of FIGS. 1, 3, 4, and 5. The optical power combining may be performed so that the relative phase difference is about 90 degrees so that the first modulatable optical reflector is configured to produce the data modulation of an I component of the optical wavelength signal, and the second modulatable optical reflector is configured to produce the data modulation of the Q component of the optical wavelength signal.

In some embodiments, the method 30 may further include passing light reflected by, at least, one of the modulatable optical reflectors through an inter-cavity optical filter configured to attenuate sidebands thereof produced by either or both of the steps 32 and 34, which operate ones of the modulatable optical reflectors. For example, the light may be reflected by the optical reflectors 5, 6, $5_X$, $6_X$, $5_Y$, $6_Y$ and filtered by one of the tunable optical filters 7, 7' of FIGS. 1, 3, 4, and 5.

In some embodiments, the method 30 may further include operating a third modulatable optical reflector of the laser to modulate a third optical beam to carry a third data stream, wherein the third optical beam is mutually coherent with the first and second optical beams. For example, the operating the first and second modulatable optical reflectors may be performed with the modulatable optical reflectors $5_X$, $6_X$ of FIGS. 4 and 5, and the operating a third modulatable optical reflector may be performed with the modulatable optical reflector $5_Y$ or $6_Y$ of FIGS. 4 and 5. Also, the method 30 may include optically combining the optical wavelength signal whose different phase components carry the first and second data streams and the modulated third optical beam with different polarizations. For example, this optically combining may be performed in the polarization combiner 22 of FIGS. 4 and 5.

In various embodiments of the method 30, the optical wavelength signal produced by the above combining step 36 may be modulated to carry the symbols of a QPSK constellation or to carry the symbols of a QAM constellation having 8, 16, 32, 64, or more symbols.

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

What is claimed is:

1. An apparatus, comprising:
 a laser having a plurality of modulatable optical reflectors, the laser being operable to emit mutually coherent optical beams from the modulatable optical reflectors; and
 an optical power combiner having a first optical input connected to receive light of one of the optical beams emitted from a first of the modulatable optical reflectors and having a second optical input connected to receive light of one of the optical beams emitted from a second of the modulatable optical reflectors; and
 an electronic controller connected to operate the first and second of the modulatable optical reflectors to cause the optical beams therefrom to carry respective first and second data streams; and
 wherein the optical power combiner is connected to interfere the light received from the first and second of the modulatable optical reflectors with a relative phase difference.

2. The apparatus of claim 1, wherein the optical power combiner is connected to output light having an in-phase component carrying the first data stream and a quadrature-phase component carrying the second data stream in response to the electronic controller operating the first and second modulatable optical reflectors.

3. The apparatus of claim 1, wherein the electronic controller is capable of operating the first and second of the modulatable optical reflectors such that the apparatus outputs light modulated according to a quadrature phase shift keying constellation.

4. The apparatus of claim 1, wherein the electronic controller is capable of operating the first and second of the modulatable optical reflectors such that the apparatus outputs light modulated according to an N-symbol quadrature amplitude modulation constellation with N being 8 or more.

5. The apparatus of claim 1, wherein the laser includes one or more inter-cavity tunable optical filters having an optical passband configured to pass light of the laser and to attenuate optical sidebands of said light, the one or more sidebands being produced by one or both of the first and second of the modulatable optical reflectors being modulated by the controller at a baud rate.

6. The apparatus of claim 1, wherein each of the modulatable optical reflectors includes a Michelson interferometric modulator.

7. The apparatus of claim 1, wherein the laser includes a 1×2 optical power splitter connecting an optical gain media and first and second separate optical path segments of the laser, the first optical path segment having a segment in the first of the modulatable optical reflectors at an end thereof, and the second optical path segment having a segment in the second of the modulatable optical reflectors at an end thereof.

8. The apparatus of claim 1, wherein the laser includes a 1×N optical power splitter coupling an optical gain media of the laser to N separate optical path segments of the laser, each of the separate optical path segments having one of the modulatable optical reflectors at an end thereof.

9. The apparatus of claim 1,
further comprising a second optical power combiner connected to receive light of one of the optical beams emitted from a third of the modulatable optical reflectors and to receive light of one of the optical beams emitted from a fourth of the modulatable optical reflectors; and
wherein the electronic controller is connected to operate the third and fourth of the modulatable optical reflectors to cause the optical beams emitted therefrom to be modulated; and
wherein the second optical power combiner is connected to interfere the light received from the third and fourth of the modulatable optical reflectors with a relative phase difference to produce a polarized output optical signal.

10. The apparatus of claim 9, further comprising a polarization combiner having optical inputs connected to combine light from the two optical power combiners with a relative polarization rotation.

11. The apparatus of claim 1, wherein the first and second of the modulatable optical reflectors are at opposite ends of an optical laser cavity of the laser.

12. A method of operating an optical data transmitter, comprising:
operating a first modulatable optical reflector of a laser to modulate a first optical beam to carry a first data stream;
operating a second modulatable optical reflector of the laser to modulate a second optical beam to carry a second data stream, wherein the second optical beam is mutually coherent with the first optical beam; and
optically combining the modulated first and second optical beams with a relative phase difference to produce a polarized optical wavelength signal whose different phase components carry the first and second data streams.

13. The method of claim 12, further comprising passing light reflected by, at least, one of the modulatable optical reflectors through an optical filter configured to attenuate sidebands thereof produced by modulation of the light reflected by the, at least, one of the modulatable optical reflectors.

14. The method of claim 12, further comprising
operating a third modulatable optical reflector of the laser to modulate a third optical beam to carry a third data stream, wherein the third optical beam is mutually coherent with the first optical beam; and
optically combining the optical wavelength signal whose different phase components carry the first and second data streams and the modulated third optical beam carrying the third data stream with different relative polarizations.

15. The method of claim 12, wherein the optical wavelength signal is modulated to carry the symbols of a quadrature phase shift keying constellation.

16. The method of claim 12, wherein the optical wavelength signal is modulated to carry the symbols of a quadrature amplitude modulation constellation with 8 or more symbols.

17. The method of claim 12, wherein the optical wavelength signal is modulated to carry the symbols of a quadrature amplitude modulation constellation with 16 or more symbols.

* * * * *